United States Patent Office 3,168,323
Patented Feb. 2, 1965

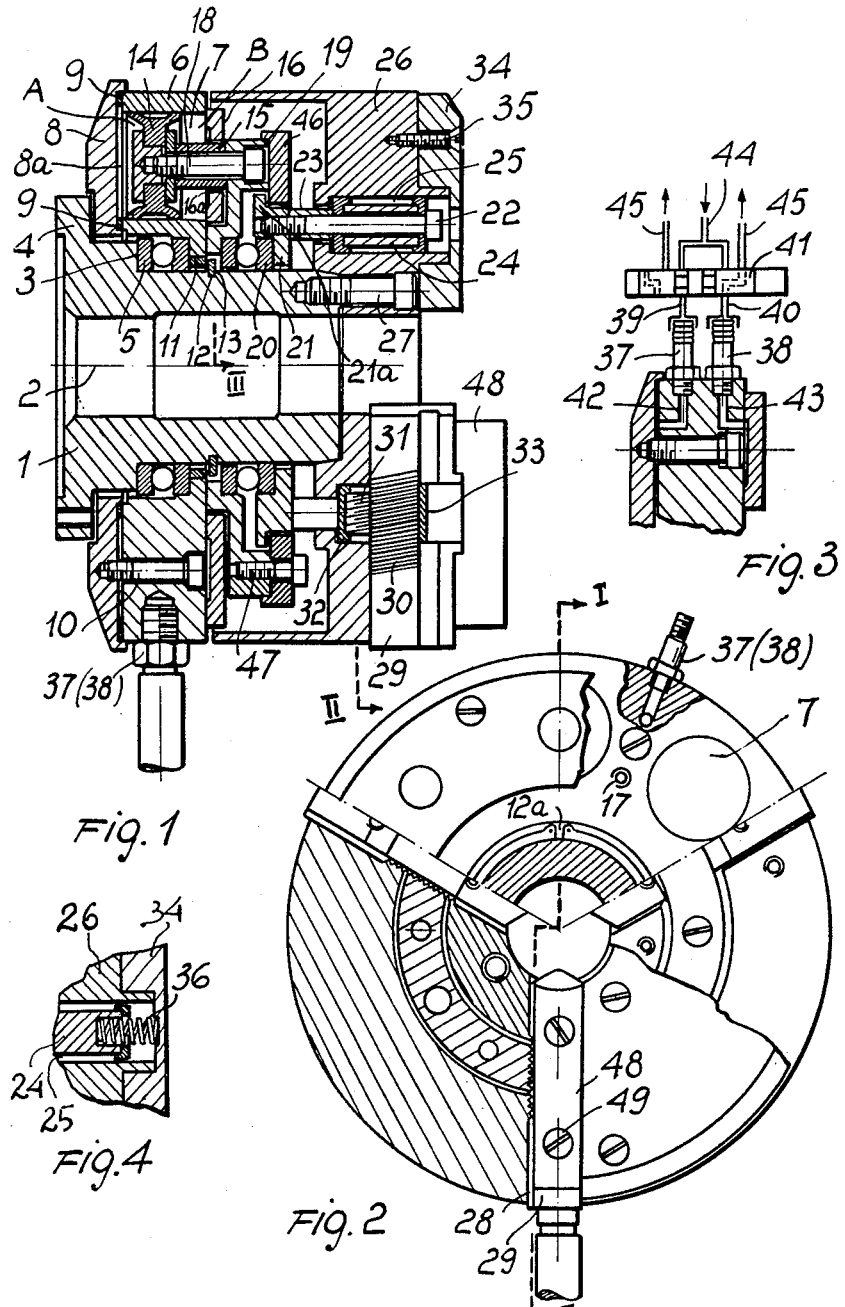

3,168,323
CHUCK WITH TOOTHED SECTOR CONTROL
Fausto Bellegrandi, Via Ugo Foscolo 9, Brescia, Italy
Filed Apr. 10, 1963, Ser. No. 271,984
Claims priority, application Italy, Apr. 12, 1962,
7,222/62
6 Claims. (Cl. 279—4)

This invention relates to a jaw chuck for machine tools with manual or single or double acting pneumatic or hydraulic control, provided with an improved jaw displacing device, adapted to be actuated during the rotation of the chuck without having to stop the machine tool.

Several jaw chuck types are today well known both with normal clamping and the so-called rapid clamping. The most current jaw chuck types use prismatic jaws having a toothing on a rear face which is engaged with a helical thread having constant pitch, provided on an underlying rotary flat portion of the chuck itself, the rotation of this helical thread portion causing simultaneous displacements in both directions of the three jaws.

These jaw chuck types have a great inconvenience because they have the driving force and the chucking resistance acting on two parallel planes spaced from one another, from which derives a rotation couple on the jaws themselves, thereby increasing sliding friction with consequent absorption of a higher power and waste of energy.

It is therefore, the object of this invention to provide an improved jaw chuck, in which besides having a quick opening and closing the frictions are greatly reduced since both the acting force and resistance are practically on the same plane without the risk of creating a rotation couple.

It is another object of this invention to provide the possibility of adding to the existing jaws additional jaws independent from the first ones and conveniently spaced from these in order to secure a better chucking, particularly on long bars having also different diameters.

It is still a further object of this invention to provide a jaw control device, adapted for whatever jaw chuck type both with manual and single or double acting pneumatic or hydraulic control.

It is still another object of this invention to provide said control device in such a way that same can keep the jaws in their closing or chucking position during the operation of the machine tool also in the event of failure, of the energy source actuating the control device for the closing and opening of the chucking jaws.

These and other objects are attained by the jaw chuck according to this invention, which includes a body connectable to the driving motor of the machine tool and a plurality of jaws, carried in a radially slidable manner by said body, and is characterized in that said jaws have on their side flanks a toothing inclined with respect to the radial sliding direction, a plurality of circular rim sector members concentrically mounted on said jaws-carrying body slidable in longitudinal axial direction with respect to said jaws-carrying body and provided each along the radial sides with a toothing, adapted to cooperate in constant mesh with a lateral toothing of two subsequent radial jaws, a jaw control device comprising at least a movable member slidable axially to the aforesaid jaws-carrying body, said control device being adapted to cause under the action of said movable control members the longitudinal displacements of said circular rim sector members and consequently the radial displacements of the jaws by effect of their inclined tooth engagement.

Further characteristics and advantages will become more apparent from the detailed description which follows, of a preferred non-limiting embodiment of the jaw chuck according to this invention illustrated by the accompanying drawing, in which:

FIG. 1 shows in longitudinal axial section according to line I—I of FIG. 2 a pneumatic jaw chuck with a jaw set actuated according to the invention;

FIG. 2 shows the same jaw chuck in a front view partially in section, according to the planes II and II perpendicular to the chuck axis;

FIGS. 3 and 4 show two details in section.

With references to FIGS. 1 and 2, reference numeral 1 indicates the chuck body which is interchangeably connectable to the driving motor of the machine tool not represented in the figures. Said body 1 represented in the figures is in the form of a sleeve member defining an axis of rotation as indicated in 2 and is provided with two annular shoulders 3 and 4 having different diameters. Against the shoulder 3 there is arranged a thrust bearing in the form of a ball or roller bearing 5 fitted on the body 1, and on said ball or roller bearing 5 is fitted an annular member 6 provided with a plurality of through-openings 7 arranged according to a circumference thereof. Said through-openings 7 are closed on one side of the annular member 6 through an annular cover member 8 arranged between the two shoulders 3 and 4 and fastened tight by seals 9 to said annular member 6 by means of the screws 10 or other equivalent means. Said two annular members 6 and 8 thus form one single unit in the form of an annular body in relative rotatory relation with respect to the body 1 of the jaw chuck owing to the interpositioning of the ball bearing 5 but held in longitudinal axial position by the contact ring 11 and the stopping ring 12 of the elastic type (owing to the cut 12a, FIG. 2) housed in the annular groove 13 provided in said body 1.

Inside each opening 7 is housed a piston 14 the stem 15 of which projects from the opening itself through an annular member 16 closing two openings 7 and secured to the annular member 6 by means of screws which are threaded in the holes 17 of said annular member 6 (FIG. 2).

The stems 15 of the pistons 14 are fastened by means of screws 18 to an annular member 19 carried by a thrust bearing in the form of a ball or roller bearing 20 having the races thereof slidably fitted on the body 1 in longitudinal axial direction. Said ball bearing 20 also carries an annular member 21 to which, by the screws 22 and interposed spacer 23 there are fastened circular rim sector members 24 slidably housed in an annular seat 25 provided in the jaws-holding or carrying body 26 secured to the body 1 by the screws 27. Said jaws-carrying body 26 has a plurality of radial grooves 28 (in the shown example three grooves are provided) in each of which there is mounted slidable in radial direction a jaw 29. Said jaws 29 are provided on their side flanks with a toothing 30 inclined with respect to the radial sliding direction, with which toothing 30 there is engaged a toothing 31 provided along the radial sides of the circular rim sector members 24. Such engagement is evidently a so-called inclined plane engagement. In this manner the toothings 31 of a circular rim sector member 24 engage respectively with the inclined toothing 30 of a side flank of two subsequent jaws 29. The three circular rim sector members 24 which are thus disposed between two subsequent jaws 29 (FIG. 2) are connected in one single body by rings 32 and 33 disposed according to parallel planes to each other and between which the jaws 29 may accomplish their radial displacements as will be seen further. To the jaws-holding body 26, between the jaws 29, there is fastened a cover member 34 by means of the screws 35. Diametrally arranged on each of said cover members 34 there are provided return springs 36 acting on circular rim sector members 24 (FIG. 4) to the effect of easing the release or return movement.

The annular body 21 is provided with an annular flange extension 21a in front of which there is the inner annular edge of an annular body 46 fastened to the annular body 19 by means of screws 47. The annular members 8 and 16, on the face turned toward the openings 7 of the annular body 6 has an annular duct in the form of an annular groove indicated by 8a and 16a, respectively, putting into communication all cylinder chambers A and B built on both sides of pistons 14 of the openings 7.

To said annular body 6 there are secured two connections 37, 38 to which are connected with one end two ducts 39 and 40, connected with their other ends to a distributing slide valve 41 of well known type (FIG. 3). By 42 and 43 there are indicated two ducts provided in the annular body 6 putting alternatively into communication via said connections 37 and 38 the chambers A and B of all openings 7, thanks to the annular grooves 8a and 16a, with the aforesaid ducts 39 and 40, said chambers constituting the cylinders of pistons 14. From said FIG. 3 can be seen that when the duct 39 through the desired positioning of the distributing piston 41 is in communication with a pressure fluid source 44 the duct 40 is in communication with an exhaust duct 45 and vice versa.

The operation of the chuck for the opening and closing movements of the radial jaws 29 will appear obvious.

When, in fact, the duct 39 through the distributing slide valve 41 is in communication with the pressure fluid source 44 and the duct 40 communicates with the exhaust duct 45 (FIG. 3), it is obvious that the fluid put into the chambers A of the cylinders 7 causes the displacement of pistons 14 and consequently through the axially slidable assembly constituted of the ball bearing 20 and the annular bodies 19, 21 and 46 and the axial displacement of the circular rim sector member 24 in their seat 25, which by the inclined toothing 31 engaged with the inclined toothing 30 of jaws 29 cause through relative displacement of said toothings the radial closing displacement of the jaws 29, thus chucking the workpiece.

Most evidently, the reverse movement, that is the opening of the jaws 29 occurs by displacing the distributing slide valve 41 in such a way as to put the duct 40 into communication with the pressure fluid source 44 and the duct 39 with the exhaust duct 45 (FIG. 3). This opening step is facilitated also by the action developed by the return springs 36 on the circular rim sector means 24.

When the jaws 29 are in the closing position and the actuating fluid should fail, said jaws 29 are kept in their closing position to continue the work which is going on by effect of the particular inclination of the toothings 30 and 31 provided in the jaws 29 and control sectors 24. In practice, it has been ascertained that an inclination of these toothings between 6° and 11° and preferably of 8°, insures a perfect stability to the jaw closing position to continue the work.

In order to increase the grip on the workpiece additional gripping members 48 can be interchangeably fastened to the jaws 29 by means of the screws 49. The end nearest to the axis of the chuck body of said members 48 can extend at a distance from said axis equal to, or different from, that of the corresponding ends of the jaws 29 in such a way as to chuck workpieces having one single or even different diameters.

Evidently, the chuck can be provided with a plurality of jaw sets, for example two jaw sets, symmetrically disposed on the chuck body with respect to the annular members of the control device. Also in this case jaws capable of chucking pieces having one single or even different diameter and also a remarkable length can be provided.

In the above described embodiment the engagement between sector members and jaws is carried out through mutual engagement toothings inasmuch as this solution has proven practically satisfactory, but it is obvious that such tooth engagement can be in practice replaced with other technically equivalent means as for example engagement between inclined sliding faces or inclined slidable groove and tongue engagement.

From the foregoing description it will be understood that the members 6, 8, 9, 11, 14, 16, 18, 19, 37, 38, 46, the right race of bearing 5 and the left race of bearing 20 do not rotate, while all other members of the chuck are rotating members.

It will be further understood that between the contacting surfaces performing a relative motion between each other convenient friction or antifriction bearing means are provided as described and illustrated in the drawing.

I claim:

1. A jaw chuck comprising a rotatable jaw carrying body with an axially extending sleeve member rigid therewith and connectable to the driving mechanism of a machine tool, said sleeve member defining an axis of rotation of said jaw chuck, a plurality of jaws slidably carried by said jaw carrying body in a direction radial to said axis of rotation, said jaws having on their side flanks at least one projecting flat inclined plane engaging surface inclined with respect to said axis of rotation, a plurality of sector members on said jaw-carrying body and in rigid rotatory relation therewith, said sector members being slidable in the direction of said axis of rotation and are provided along the radial sides thereof with at least one counter engaging inclined plane surface in constant slidable inclined plane engagement with said inclined plane engaging surface, a non rotating annular body on said sleeve member, a first thrust bearing allowing relative rotation of said sleeve member with respect to said non rotating annular body, a plurality of pressure fluid cylinder chambers in said non rotating annular body, each of said cylinder chambers having a piston slidable therein in a direction parallel to said axis of rotation, a first annular member surrounding said sleeve member and rigid with said pistons, a second annular member surrounding said sleeve member and rigid with said sector members, an axially slidable thrust bearing on said sleeve member and having an axially slidable race thereof rigid with said first annular member and the other axially slidable race thereof rigid with said second annular member, thereby allowing said pistons to displace said sector members in a direction parallel to said axis of rotation through said slidable thrust bearing, duct means in said non rotating annular body connecting said cylinder chambers with the pressure fluid supply.

2. A jaw chuck according to claim 1, wherein said engaging and counterengaging inclined plane surfaces are in the form of constant mesh toothings, said cylinder chambers are double acting cylinder chambers.

3. A jaw chuck according to claim 1, wherein said inclined plane surfaces have an inclination ranging from 6° to 11° with respect to said axis of rotation.

4. A jaw chuck according to claim 1, wherein spring means are provided in said jaw carrying body and biasing said sector members towards said pistons.

5. A jaw chuck according to claim 1, including additional jaw members removably fastened to the jaws for gripping workpieces of different diameters.

6. A jaw chuck according to claim 1, wherein said first annular member has an annular extension extending between said sector members and said second annular member to engage and entrain therewith said second annular member during the return movement of said first annular member.

References Cited in the file of this patent
UNITED STATES PATENTS

| | | |
|---|---|---|
| 2,854,239 | Lammens | Sept. 30, 1958 |
| 2,860,881 | Perrachione | Nov. 18, 1958 |
| 2,948,541 | Reich | Aug. 9, 1960 |
| 3,096,988 | Skillin | July 9, 1963 |